United States Patent Office 2,805,599
Patented Sept. 10, 1957

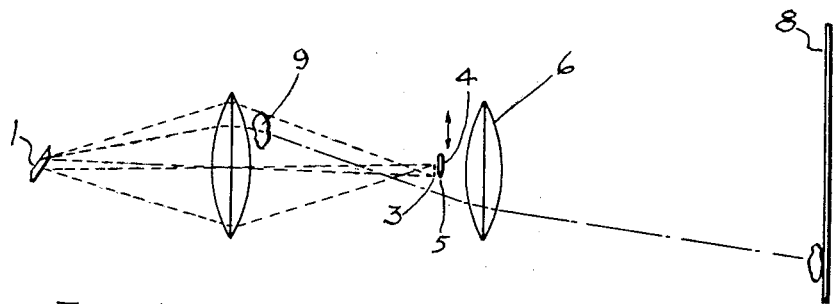
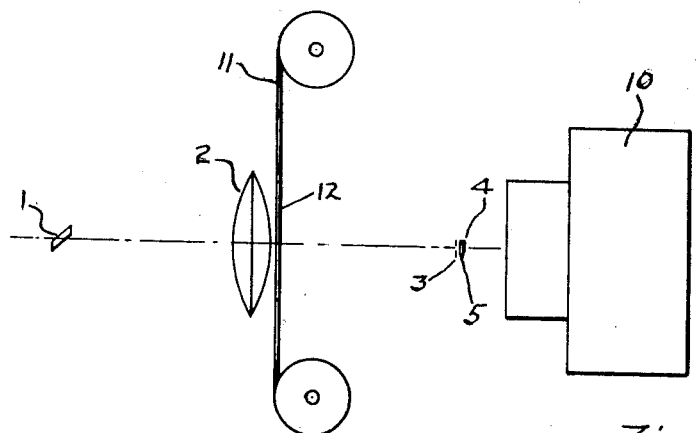
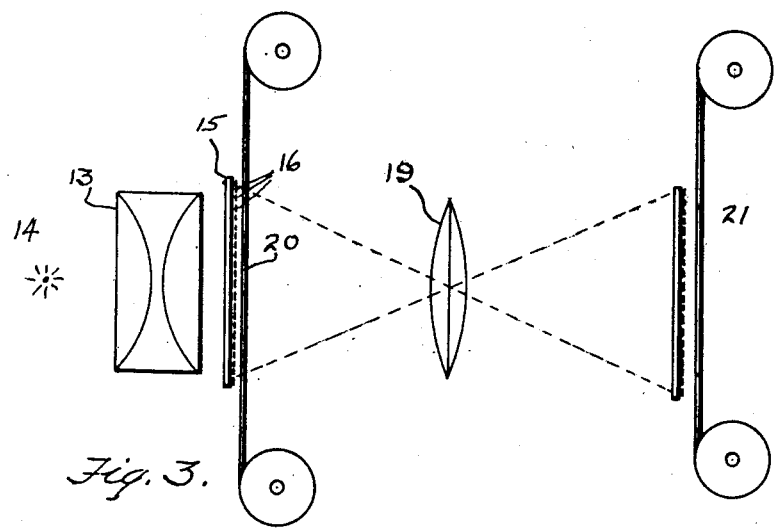

2,805,599

OPTICAL CONTRAST AMPLIFIER

Wolf Szmul Pajes, New York, N. Y.

Application April 9, 1954, Serial No. 422,067

7 Claims. (Cl. 88—24)

This invention relates to an optical contrast amplifier and has for its principal object to provide an apparatus for amplifying inadequately recorded optical contrasts in transparent media, especially photographic film.

When motion picture film has been underexposed by accident, necessity, or by design, the contrast of the recorded image is in itself inadequate for visual observation and must be amplified in some manner before it can be used. The underexposure may be caused by an underestimate of the required time of exposure, or by an accidental shutting of the iris of the camera lens, resulting in too small a lens opening. It might also be caused by necessity when the available illumination in combination with the available time is not sufficient to result in a satisfactory exposure, which conditions might be found in high speed photography. In both cases, as above stated, the film record will be unusable or unsatisfactory, and a retake will be necessary, which is not always possible. The contrast amplifier of the invention makes it possible to reproduce the film record at full contrast value.

The most important application of the optical amplifier of the invention, however, is the case in which it is desired to keep the illumination of the scene to be photographically recorded low for comfort and economy purposes. This is the case in film studios where the illumination level is very high, causing great discomfort and adding considerably to the cost of motion picture production.

Another application of the contast amplifier of this invention is to make higher speed photography possible, all other factors, like emulsion sensitivity and available illumination, remaining the same.

The basic principle underlying this invention is the well-known "Schlieren method" for observation of optical inhomogeneities in transparent media.

The invention is illustrated in the accompanying drawings, in which:

Figure 1 is a schematic side elevational view of the apparatus for carrying out the Schlieren method of observing optical inhomogeneities in transparent media;

Figure 2 is a similar schematic view of the apparatus according to the invention; and Figure 3 is a similar schematic view of a modified form of the apparatus.

Referring to Figure 1 of the drawings, light from source 1, preferably rectangular in configuration, with a sharply defined edge, falls towards an optically perfect achromatic, long focus, objective lens 2 which is spaced from the source a distance greater than the focal distance of the lens and which forms an image 3 of the source in the image plane. A plate 4 having knife edge 5 is mounted in the plane of the image 3 and is arranged so that its position may be adjusted within the image plane to completely obscure the image. A projection lens 6 is mounted adjacent the plane of the image 3 in such a position as to project an image of the lens 2 onto a screen 8, placed at a suitable distance from the projection lens.

The size of the light source 1 should be considerably smaller than the objective 2 and the projection lens 6 should be considerably larger than the image of the light source.

The apparatus just described is that of the Schlieren method referred to above, and in operating the apparatus, the plate 4 is adjusted by moving it in the plane of the image 3 across the image until the knife edge 5 reaches the image of the sharply defined edge of the light source. When this occurs, all light from the source will be cut off from the screen 8 and the screen will appear dark.

However, even a slight change in the optical properties of the objective or in the neighboring medium, specifically any change in the refractive index, will cause a deviation of the path of light rays, thus directing them beyond the knife edge 5 of the plate 4 and, since they will then fall on the projection lens 6, forming an image on the screen 8 which will picture the areas in the cross section of the light beam where the changes in refractive index have taken place. The presence of any transparent object, such as indicated at 9 in Figure 1, will be equivalent to such a change in refractive index and will be pictured on the screen 8.

Because of the long focal length of the lens 2, the apparatus is very sensitive and capable of detecting very small changes in refractive index.

The present invention is illustrated in Figure 2 and makes use of this principle. In this figure, the same reference characters have been given parts having the same function. However, in place of the screen 8 of Figure 1, I provide a camera 10 the lens of which is focused on a plane 11 in close proximity to the lens 2. As has been pointed out, a change in refractive index or an inherent inhomogeneity in the surrounding medium is necessary in order to become visible or recordable. An underexposed film 12 may then then be placed to coincide with the plane 11 in place of the object 9 in Figure 1, and the physical differences caused by exposure in the film emulsion will represent the differences in refractive index which will then become visible to the camera 10. The physical differences in the emulsion are caused by the changes which take place in the photosensitive emulsion containing, for example, salts of silver chloride, iodine, and bromine, when exposed to light. In addition to partial decomposition of the salts under the influence of light, a change of refractive index takes place. When such a film, carrying a barely perceptible record of a scene, because it has been under-exposed and therefore its photosensitive salts have undergone only a slight change, is introduced into the path of light, as shown in Figure 2, a strong contrast picture will appear on the photosensitive film in the camera, reproducing the latent picture recorded on the film 12, but of course with the light portions dark and the dark portions light. Because of the blocking action of the plate 4, substantially all of the background light will be blacked out and the photographic record of the underexposed film will be produced in full contrast. If the film 12 is a negative, the film in the camera will contain a positive picture, but if the film 12 is a positive, then the camera film will come out negative and will, of course, have to be printed to obtain a positive picture.

The variable factors by means of which the contrast can be controlled are:

(1) The intensity of the source 1 of light.
(2) The completeness of the shutting off of the light by the plate 4 with its knife edge 5.
(3) The time of exposure of the retake with the camera 10.

The Schlieren method, often referred to as the "Striae method" has recently been markedly improved through use of a pair of line rasters in the path of the light, making it possible to use ordinary lenses instead of optically perfect lenses and, at the same time, permitting the control of much bigger light fluxes for the same amount of change in the homogeneity of the optical medium (refractive index).

A simple arrangement using such rasters is shown in Figure 3. Here a condenser lens system 13 collects light from a light source 14 and directs it onto a first raster 15. This raster 15 comprises a transparent plate having opaque parallel lines 16 thereon, the width of the lines and the spaces between the lines being in the order of 50 microns. A second raster 17 is spaced from the first raster 15 with its lines 18 parallel to the lines thereof. The width of the lines of the second raster 17 and of the spaces between the lines may differ from that of the first raster in a manner to be described. An image of the first raster 15 is then projected onto the second raster 17 by means of an ordinary objective lens 19 in such a manner that the collimated light going through the raster 15 will fall on the opaque lines of the second raster 17. In order to accomplish this, the lines and spaces on the second raster 17 must be of the proper width to be optically conjugate to the image of the lines and spaces of the first raster 15. When the proper dimensions are provided and the position of the second raster 17 is correct, no light will pass through the second raster 17 under normal conditions. When, however, an underexposed film 20 is placed between the two rasters, preferably adjacent the first raster 15, the necessary changes in refractive index will be supplied, light the second raster, and the image of the record on the film may be photographed in full contrast. For this purpose a photographic film 21 may be placed in a plane where the image of the underexposed film 20, as projected by the lens 19, will fall, in which case an image in full contrast of the record on the underexposed film 20 will be reproduced in opposite sense upon the film 21.

Modifications may be made in the apparatus shown and described without departing from the spirit of the invention, and I do not therefore wish to be limited except by the limitations contained in the appended claims.

What I claim and desire to secure by Letters Patent is:

1. A contrast amplifier comprising a light source, means for supporting a transparency in the path of light from said source, means for normally causing all light rays passing through each point in a predetermined area in the plane of said transparency supporting means in the absence of said transparency to converge at a predetermined plane, means at said predetermined plane for obstructing only that light normally controlled by said last-mentioned means in the absence of said transparency, whereby light from corresponding points of a transparency positioned in said supporting means because of the difference of refractive index of said points may be deflected so as to pass said obstructing means, and means for photographically recording an image of the record which appears on said transparency from light passing said obstructing means.

2. A contrast amplifier, according to claim 1, in which the light converging means comprises a long focus, achromatic objective lens positioned between the transparency-supporting means and the light source, and the light obstructing means comprises a plate with a knife edge adjustably mounted in the converging plane.

3. A contrast amplifier, according to claim 2, in which the means for photographically recording an image of the record which appears on the transparency comprises a camera having a lens larger than the light obstructing means positioned in front of and adjacent to said light obstructing means with said lens focused on the plane of said transparency.

4. A contrast amplifier, according to claim 1, in which the light converging means comprises an objective lens and the light obstructing means comprises first and second rasters, said first raster positioned between the light source and the objective lens and said second raster positioned in the plane of the image of said first raster produced by said objective lens, the transparency-supporting means being adjacent said first raster.

5. A contrast amplifier, according to claim 4, in which the means for photographically recording an image of the record which appears on the transparency comprises a member having a photosensitive surface positioned adjacent said second raster to receive light passing therethrough.

6. A contrast amplifier comprising a light source having a straight edge, an achromatic, long-focus, objective lens spaced from said source a distance greater than the focal length thereof, a plate having a knife edge thereon positioned normal to the axis of said objective lens in the plane of the image of said light source and adjustably mounted for movement in said plane, said plate being just large enough to cover said image, means for supporting a photographic film adjacent said achromatic lens and between said lens and said plate, and a camera having a lens larger than said image positioned on the other side of said plate from said achromatic lens, said camera having its lens focused on the plane of said film-supporting means.

7. A contrast amplifier comprising a light source, a first raster spaced from said source, a condenser lens between said source and said first raster and adapted to direct light upon said first raster, a second raster spaced from said first raster, an objective lens between said rasters and adapted to project an image of said first raster upon said second raster, the lines of said second raster being conjugate to the image of the lines of said first raster, means for supporting a film in a plane between said first raster and said objective lens and adjacent said first raster, and a photosensitive member positioned on the opposite side of said second raster from said objective lens and adjacent said second raster.

References Cited in the file of this patent

UNITED STATES PATENTS 2,256,855    Zobel                  Sept. 23, 1941
2,362,235    Barnes                Nov. 7, 1944

OTHER REFERENCES

Book, "Photographic Study of Rapid Events," Chesterman, 1951, page 105.